3,801,595
DISPERSE DYES OF THE ANTHRAQUINONE SERIES
Ernst Hartwig, Heidelberg, Germany, assignor to Badische Anilin- & Soda-Fabrik Aktiengesellschaft, Ludwigshafen (Rhine), Germany
No Drawing. Filed Apr. 20, 1972, Ser. No. 245,867
Int. Cl. C07d 27/50
U.S. Cl. 260—325                                    6 Claims

ABSTRACT OF THE DISCLOSURE

Disperse dyes of the formula:

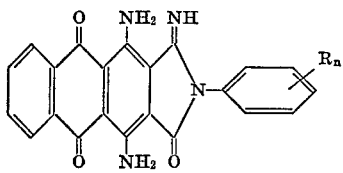

in which R is hydrogen, halogen, alkyl, alkoxy, α-hydroxyethyl, β-hydroxyethyl, β-hydroxyethoxy, β,β-dicarbalkoxyethyl or carbalkoxy and n is one of the integers, 1, 2 and 3.

The dyes dye linear polyester fibrous material greenish blue shades. The dyeings have excellent fastness properties.

---

The invention relates to new and valuable disperse dyes of the anthraquinone series which are derived from 5,6-phthaloyldihydroisoindole.

The new dyes have the Formula I:

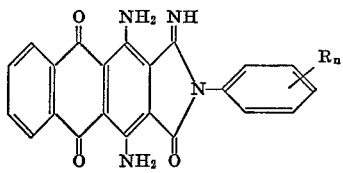

where R is hydrogen, halogen, alkyl of one to twelve carbon atoms, alkoxy of one or two carbon atoms, α-hydroxyethyl, β-hydroxyethyl, β-hydroxyethoxy, β,β-dicarbalkoxyethyl or carbalkoxy of one to three carbon atoms in the alkoxy group, and n is one of the integers 1, 2 and 3.

The new dyes go onto linear polyester and cellulose triacetate fibers to give beautiful greenish blue shades. Dyeings having excellent fastness properties are obtained. This result was not to be expected because dyes of similar constitution such as the 1-phenylimino-3-oxo-4,7-diamino-5,6-phthaloyldihydroisoindole described in French Pat. 1,104,697 and the 1,3-dioxo-2-aryl-4,7-diamino-5,6-phthaloyldihydroisoindole described in French Pat. 1,410,259 do not exhibit good affinity for polyesters.

The new dyes of the invention give substantially greener shades than the dyes disclosed in U.S. Pats. 2,628,963 and 2,701,802 and German Pats. 1,176,777 and 1,250,031.

Examples of aryl radicals in the new dyes of the invention are: phenyl, alkylphenyl such as o-tolyl, m-tolyl, p-tolyl, xylyl, mesityl, sec-butylphenyl and n-dodecylphenyl, halophenyl such as o-chlorophenyl, m-chlorophenyl, p-chlorophenyl, o-bromophenyl, m-bromophenyl, p-bromophenyl, oxalkylphenyl, oxalkoxyphenyl or carbalkoxyphenyl such as β-hydroxyethoxyphenyl, β-hydroxyethylphenyl, β,β - dicarbethoxyethylphenyl, α - hydroxyethylphenyl, o-carbomethoxyphenyl or p-carbomethoxyphenyl.

Dyes of the Formula I in which R is alkyl of one to six carbon atoms and n is 1, 2 or 3 are particularly preferred.

Particularly preferred aryl radicals are thus o-tolyl, m-tolyl, p-tolyl, xylyl, o-n-propylphenyl, m-n-propylphenyl, p-n-propylphenyl, m-isopropylphenyl, p-isopropylphenyl, o-n-butylphenyl, m-n-butylphenyl, p-n-butylphenyl, m-isobutylphenyl, p-isobutylphenyl, o-n-hexylphenyl, m-n-hexylphenyl, p-n-hexylphenyl, m-isohexylphenyl, p-isohexylphenyl, di-n-propylphenyl, diisopropylphenyl, di-n-butylphenyl, diisobutylphenyl, di-n-hexylphenyl, diisohexylphenyl or mesity (2,4,6-trimethylphenyl).

Above all, those dyes of the Formula I are preferred in which R is propyl, isopropyl, n-butyl or isobutyl and n is 1 or 2, or R is a methyl group and n is 3.

The new dyes are prepared by reaction of a 1-amino-4-nitro-anthraquinone-2-carboxylic arylamide or the corresponding 1,4-diamino compound with a cyanide and in both cases the 1 - imino-2-aryl-3-oxo - 4,7 - diamino-5,6-phthaloyldihydroisoindole is obtained direct. The reaction may be carried out in a great variety of solvents which are inert under the reaction conditions. Examples of such solvents are water-soluble alcohols such as methanol, ethanol, n-propanol, isopropanol, n-butanol, isobutanol, ether alcohols such as glycolmonomethyl ether, glycolmonoethyl ether, glycolmonopropyl ether, glycolmonobutyl ether, ethylene diglycol monomethyl ether, ethylene triglycol monobutyl ether, dimethylsulfoxide, carboxamides, carboxalkylamides or dialkylamides such as formamide, dimethylformamide, diethylformamide, dimethylacetamide, diethylacetamide, cyclic carboxamides such as N-methylpyrrolidone or mixtures thereof with one another and/or with water.

It is advantageous to use sodium cyanide or potassium cyanide as the cyanide. The reaction may however be carried out in the presence of a compound which yields cyanide ions during the reaction. Acetone cyanohydrin or mandelonitrile are suitable as compounds of the said type. The cyanation reaction proceeds in some cases even at room temperature in ninety minutes to two hours, particularly when the reaction is carried out in an aprotic solvent, such as dimethyl sulfoxide, N,N-dimethylformamide or N-methylpyrrolidone. When solvents are used which contain hydroxyl groups, longer reaction periods are necessary for complete reaction.

The reaction can take place at room temperature, but for acceleration it is advantageously carried out at a temperature of from 40° to 100° C. At the said temperatures the reaction is generally over after two to eight hours. The end of the reaction can be established chromatographically. When 1,4-diamino-2-carboxarylamides are used as starting compounds, the dyes is generally obtained in the form of the leuco compound or a mixture containing the dye and its leuco compound. In this case the reaction mixture is treated with an oxidizing agent. Nitro compounds, for example nitrobenzene, nitrobenzenesulfonic acid or atmospheric oxygen may be used as oxidizing agent in the presence or absence of an oxidation catalyst such as potassium ferrocyanide.

Since hydroxyl ions are formed in the reaction of the cyanide or cyanide ion with the 1-amino-4-nitroanthraquinone-2-carboxarylamide or 1,4-diaminoanthraquinone-2-carboxarylamide it is advantageous to bind the hydroxyl ions in the reaction mixture and thus remove them. Esters such as glycol monoacetate, or salts of weak acids with weak bases such as ammonium acetate, may be added to bind the hydroxyl ions formed in the reaction.

The following examples illustrate the invention. Parts and percentages in the following are by weight.

EXAMPLE 1

10 parts of 1,4-diaminoanthraquinone-2-carboxanilide is stirred into 80 parts of formamide. 5 parts of sodium cyanide, 1 part of potassium ferrocyanide, 10 parts of nitrobenzene and 3 parts of ammonium acetate are added and the whole is stirred for half an hour while passing air through at room temperature. The whole is then heated to 70° to 75° C. and stirring is continued for about eight hours while passing air through. A thin layer chromatogram confirms that starting material is no longer present. Then 40 parts of water is added at 60° to 70° C., suction filtration is carried out while still hot and the filter cake is washed with hot water and finally with 50 parts of methanol until the liquid which drains away is pure blue. 10 parts of 1 - imino - 2-phenyl-3-oxo-4,7-diamino-5,6-phthaloyldihydroisoindole is obtained having a melting point of 302° to 303° C. It crystallizes to form small blue needles. The compound contains 69% carbon, 3.7% hydrogen and 14.5% nitrogen. The dye goes onto polyesters in beautiful clear turquoise blue shades having very good fastness properties.

1,4-diaminoanthraquinone-2-carboxanilide which is used as the starting material is obtained by reaction of 1-amino-4-nitroanthraquinone-2 - carboxylic chloride with aniline followed by reduction for example with sodium sulfide.

EXAMPLE 2

Reaction of 1-amino-4-nitroanthraquinone-2-carboxylic chloride with aniline followed by reduction to 1,4-diaminoanthraquinone-2 - carboxanilide can also be combined with cyanation in one stage as follows:

66 parts of 1-amino-4-nitroanthraquinone-2-carboxylic chloride is introduced into a mixture of 350 parts of formamide and 55 parts of aniline in such a way that the temperature does not rise above 50° to 55° C. Then 50 parts of glycol monoacetate and 15 parts of sodium cyanide are introduced, the temperature thus rising to 65° to 70° C. As soon as the heat of reaction has subsided, 5 parts of sodium cyanide is added on five occasions at intervals of half an hour, the whole being stirred finally for another two hours at 90° to 95° C. Thin layer chromatography confirms that starting product is no longer present. The whole is diluted with an equal volume of hot water, suction filtered while hot, washed with hot water until the liquid draining away is colorless, and rinsed with cold methanol until the effluent is pure blue. 62 parts of the dye described in Example 1 is obtained.

EXAMPLE 3

10 parts of 1,4-diaminoanthraquinone-2-carboxylic-o-anisidide and 3.5 parts of sodium cyanide are stirred into 60 parts of dimethyl sulfoxide and stirring is continued at room temperature while passing air through until all the starting product has been used up. This is usually the case after ninety minutes to two hours. The product is worked up as in Example 1 and 9 parts of a dark blue microcrystalline powder is obtained having the formula:

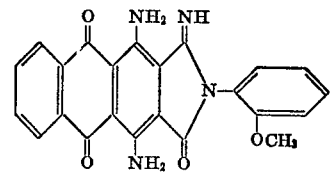

The compound melts at 283° to 285° C. and contains 13.5% nitrogen. The dye goes onto polyesters in beautiful turquoise blue shades (high-temperature process).

When amides of the amines specified in the following table are used instead of 1,4 diamino-2-carboxylic-o-anisidide, the dyes specified by reference to the substitutents in the following formula are obtained, which also have outstanding tinctorial properties:

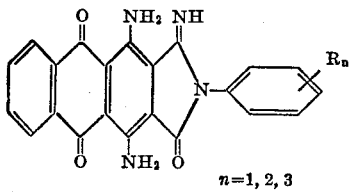

$n = 1, 2, 3$

| Example | Amine | R | Position | Melting point, °C. |
|---|---|---|---|---|
| 4 | p-Anisidine | —O—CH₃ | (4) | ¹ 340 |
| 5 | o-Toluidine | —CH₃ | (2) | 240–245 |
| 6 | p-Toluidine | —CH₃ | (4) | |
| 7 | { p-Xylidine<br>(2,5-dimethylaniline) } | —CH₃<br>—CH₃ | (2)<br>(5) | } 213–216 |
| 8 | { o-Xylidine<br>(3,4-dimethylaniline) } | —CH₃<br>—CH₃ | (3)<br>(4) | } 245–247 |
| 9 | p-Chloroaniline | —Cl | (4) | ¹ 380 |
| 10 | H₂N—⟨⟩—CH₂—CH(COOC₂H₅)₂ | —CH₂—CH(COOC₂H₅)₂ | (3) | 225–226 |
| 11 | H₂N—⟨⟩ | —OCH₂CH₂—OH | (4) | 245–253 |
| 12 | H₂N—⟨⟩—CHOH—CH₃ | —CHOH—CH₃ | (3) | 225–229 |
| 13 | H₂N—⟨⟩—CH₂CH₂OH | —CH₂—CH₂OH | (4) | 281–282 |
| 14 | H₂N—⟨⟩—COOCH₃ | —COOCH₃ | (4) | 335–345 |
| 15 | ⟨⟩—NH₂ / —COOCH₃ | —COOCH₃ | (2) | >365 |
| 16 | H₂N—⟨⟩—C₁₂H₂₅ | —C₁₂H₂₅ | (4) | 160–163 |

See footnote at end of table.

TABLE—Continued

| Example | Amine | R | Position | Melting point, °C. |
|---|---|---|---|---|
| 17 | H₂N—⌬—CH(CH₃)(C₂H₅) | —CH(CH₃)(C₂H₅) | (4) | 204–208 |
| 18 | 3-CH₃-C₆H₄-NH₂ | —CH₃ | (3) | .......... |
| 19 | 2-C₂H₅-C₆H₄-NH₂ | —C₂H₅ | (2) | 156–157 |
| 20 | 3-C₂H₅-C₆H₄-NH₂ | —C₂H₅ | (3) | .......... |
| 21 | 4-C₂H₅-C₆H₄-NH₂ | —C₂H₅ | (4) | 273–282 |
| 22 | 2,6-(CH₃)₂-C₆H₃-NH₂ | —CH₃<br>—CH₃ | (2)<br>(6) | 204–205 |
| 23 | 2-C₃H₇-C₆H₄-NH₂ | —(n)C₃H₇ | (2) | .......... |
| 24 | 4-(n)C₃H₇-C₆H₄-NH₂ | —(n)C₃H₇ | (4) | 231–233 |
| 25 | 3-CH(CH₃)₂-C₆H₄-NH₂ | —CH(CH₃)₂ | (3) | .......... |
| 26 | 4-CH(CH₃)₂-C₆H₄-NH₂ | —CH(CH₃)₂ | (4) | 225–229 |
| 27 | 2-(n)C₄H₉-C₆H₄-NH₂ | —(n)C₄H₉ | (2) | .......... |
| 28 | 3-(n)C₄H₉-C₆H₄-NH₂ | —(n)C₄H₉ | (3) | .......... |
| 29 | 4-(n)C₄H₉-C₆H₄-NH₂ | —(n)C₄H₉ | (4) | 218–226 |

See footnote at end of table.

TABLE—Continued

| Example | Amine | R | Position | Melting point, °C. |
|---|---|---|---|---|
| 30 | 3-(sec-butyl)aniline | —CH(CH₃)(C₂H₅) | (3) | |
| 31 | 4-tert-butylaniline | —C(CH₃)₃ | (4) | 250–256 |
| 32 | 3-n-hexylaniline | —(n)—C₆H₁₃ | (3) | |
| 33 | 4-n-hexylaniline | —(n)—C₆H₁₃ | (4) | 235–237 |
| 34 | 3-ethyl-5-methylaniline | —C₂H₅, —C₂H₅ | (2), (5) | |
| 35 | 3-ethyl-5-methylaniline | —C₂H₅, —C₂H₅ | (3), (4) | |
| 36 | 3,5-di(sec-butyl)aniline | —CH(CH₃)(C₂H₅), —CH(CH₃)(C₂H₅) | (2), (5) | |
| 37 | 3-n-hexylaniline | (n)—(CH₂)₄—CH₃ | (4) | 198–200 |
| 38 | 2,4,6-trimethylaniline | —CH₃, —CH₃, —CH₃ | (2), (4), (6) | |

¹ With decomposition.

I claim:
1. A disperse dye of the anthraquinone series of the formula

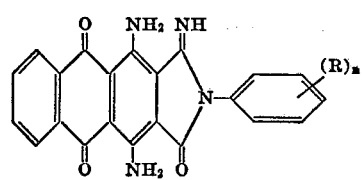

(I)

wherein:
R is hydrogen;
R is methoxy, β-hydroxyethoxy, alkyl of 1 to 6 carbon atoms, β,β-dicarbethoxyethyl, α-hydroxyethyl, β-hydroxyethyl, carbomethoxy or chlorine when n=1;
R is methyl, ethyl, n-propyl, isopropyl, n-butyl or isobutyl when n=2; or
R is methyl when n=2; or
R is methyl when n=3.

2. A disperse dye as claimed in claim 1, wherein R is methyl, ethyl, n-propyl, isopropyl, n-butyl, isobutyl, tert. butyl, n-pentyl, n-hexyl or isohexyl and n is the integer 1.

3. A disperse dye as claimed in claim 1, wherein R is methyl, ethyl, propyl or butyl and *n* is the integer 2.
4. A disperse dye as claimed in claim 1, wherein R is methyl and *n* is the integer 3.
5. A disperse dye of the formula:
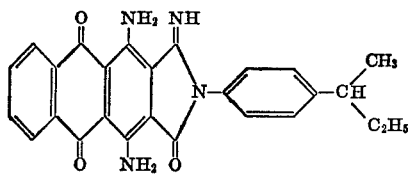
6. A disperse dye of the formula:
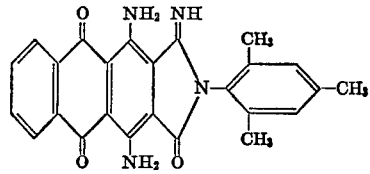
References Cited
UNITED STATES PATENTS
3,137,699  6/1964  Hartwig _____ 260—272
3,294,815  12/1966  Hartwig _____ 260—325
JOSEPH A. NARCAVAGE, Primary Examiner
U.S. Cl. X.R.
8—40, 58

UNITED STATES PATENT OFFICE
CERTIFICATE OF CORRECTION

Patent No. 3,801,595             Dated April 2, 1974

Inventor(s) Earnst Hartwig

It is certified that error appears in the above-identified patent and that said Letters Patent are hereby corrected as shown below:

Column 1, line 8, insert,
-- [30]   Foreign Application Priority Data
     May 3, 1971    Germany . . . . . . P 21 21 570.3 --.

Column 4, line 31, insert -- - -- after "1,4".

Column 4, lines 32-33, "substitutents" should read -- substituents --.

Columns 3&4, Table, example 11, "Amine" column,

"" should read --  --.

Column 8, line 71, delete "R is methyl when n=2;or"

Signed and sealed this 22nd day of October 1974.

(SEAL)
Attest:

McCOY M. GIBSON JR.              C. MARSHALL DANN
Attesting Officer                Commissioner of Patents